(12) United States Patent
Hayashi

(10) Patent No.: US 9,196,093 B2
(45) Date of Patent: Nov. 24, 2015

(54) INFORMATION PRESENTATION DEVICE, DIGITAL CAMERA, HEAD MOUNT DISPLAY, PROJECTOR, INFORMATION PRESENTATION METHOD AND NON-TRANSITORY COMPUTER READABLE MEDIUM

(71) Applicant: FUJIFILM Corporation, Tokyo (JP)

(72) Inventor: Daisuke Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 251 days.

(21) Appl. No.: 13/853,188

(22) Filed: Mar. 29, 2013

(65) Prior Publication Data

US 2013/0215149 A1    Aug. 22, 2013

Related U.S. Application Data

(63) Continuation of application No. PCT/JP2011/062275, filed on May 27, 2011.

(30) Foreign Application Priority Data

Sep. 30, 2010 (JP) ................................. 2010-223278

(51) Int. Cl.
*G09G 5/00* (2006.01)
*G06T 19/00* (2011.01)
*G06T 15/20* (2011.01)

(52) U.S. Cl.
CPC .............. *G06T 19/006* (2013.01); *G06T 15/20* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 2005/0024388 A1 | 2/2005 | Takemoto | |
| 2005/0280661 A1* | 12/2005 | Kobayashi et al. | 345/633 |
| 2006/0273984 A1 | 12/2006 | Wanda et al. | |
| 2008/0111832 A1* | 5/2008 | Emam et al. | 345/633 |
| 2009/0232354 A1* | 9/2009 | Camp et al. | 382/103 |

FOREIGN PATENT DOCUMENTS

| | | |
|---|---|---|
| JP | 1055257 | 2/1998 |
| JP | 2000331190 A | 11/2000 |
| JP | 200462756 A | 2/2004 |
| JP | 200549996 A | 2/2005 |
| JP | 2005174021 A | 6/2005 |

(Continued)

OTHER PUBLICATIONS

Written Opinion (PCT/ISA/237) issued Jun. 28, 2011, in International Application No. PCT/JP2011/062275.

(Continued)

*Primary Examiner* — Yingchun He
(74) *Attorney, Agent, or Firm* — Sughrue Mion, PLLC

(57) ABSTRACT

A digital camera functioning as an information presentation device is provided with a CG superimposition unit 17 which functions so that a virtual object is superimposed on a real space image captured by an imaging element 3, and is displayed on a display unit 23; a visual line detection unit 12 which detects a visual line of a person included in the real space image captured by the imaging element 3; and a superimposing position determination unit 11 which determines a superimposing position of the virtual object on the basis of the visual line detected by the visual line detection unit 12.

14 Claims, 16 Drawing Sheets

(56) References Cited

FOREIGN PATENT DOCUMENTS

| | | | |
|---|---|---|---|
| JP | 2006227838 A | 8/2006 |
| JP | 2006301924 A | 11/2006 |
| JP | 200726073 A | 2/2007 |
| JP | 2009289035 A | 12/2009 |
| JP | 201044448 A | 2/2010 |

OTHER PUBLICATIONS

International Search Report (PCT/ISA/210); issued Jun. 28, 2011; in corresponding International Application No. PCT/JP2011/062275.
Chinese Office Action dated Sep. 7, 2015, issued in corresponding Chinese Patent Application No. 201180047398.9.

* cited by examiner

FIG. 6

| PERSON 1 | | | PERSON 2 | | | PERSON 3 | | | SUPER-IMPOSED CG |
|---|---|---|---|---|---|---|---|---|---|
| SEX | AGE | COSTUME | SEX | AGE | COSTUME | SEX | AGE | COSTUME | |
| MAN | 30-35 | – | WOMAN | 30-35 | – | MAN | 0-5 | – | CAR |
| MAN | 30-35 | – | WOMAN | 30-35 | – | WOMAN | 0-5 | – | DOLL |
| MAN | 20-25 | UNIFORM | MAN | 20-25 | UNIFORM | MAN | 20-25 | REFEREE UNIFORM | SOCCER BALL |

FIG. 10

| PERSON 1 | | | PERSON 2 | | | ANGLE OF NORMAL VECTOR | SUPER-IMPOSED CG |
|---|---|---|---|---|---|---|---|
| SEX | AGE | COSTUME | SEX | AGE | COSTUME | | |
| MAN | 30-35 | TUXEDO | WOMAN | 30-35 | WEDDING DRESS | $0 \leq \theta \leq \pi/8$ | LARGE HEART |
| MAN | 30-35 | TUXEDO | WOMAN | 30-35 | WEDDING DRESS | $\pi/8 \leq \theta \leq \pi/4$ | SMALL HEART |
| MAN | 20-25 | UNIFORM | MAN | 20-25 | UNIFORM | $0 \leq \theta \leq \pi/8$ | FLARE |

INFORMATION PRESENTATION DEVICE, DIGITAL CAMERA, HEAD MOUNT DISPLAY, PROJECTOR, INFORMATION PRESENTATION METHOD AND NON-TRANSITORY COMPUTER READABLE MEDIUM

CROSS REFERENCE TO RELATED APPLICATION

This is a continuation of International Application No. PCT/JP2011/062275 filed May 27, 2011, claiming priority from Japanese Patent Application No. 2010-223278 filed Sep. 30, 2010, the contents of all of which are incorporated herein by reference in their entirety.

TECHNICAL FIELD

The present invention relates to an information presentation device, a digital camera, a head mount display, a projector, an information presentation method, and a non-transitory computer readable medium.

BACKGROUND ART

An augmented reality technology in which a virtual object is superimposed and displayed on a real space image (a captured image) photographed by a camera has been distributed, and a mobile phone or a head mount display (HMD) in which the augmented reality technology is employed is appearing.

An augmented reality providing apparatus which provides such an augmented reality generally displays an image adapted for a user who has the augmented reality providing apparatus on a display unit. For example, in Patent Literature 1, a virtual object to be superimposed on a captured image is determined according to a line-of-sight of a user who wears a HMD.

When it becomes possible to display in consideration of a person who is photographed by a camera without being limited to a user who has the augmented reality providing apparatus, the use of the augmented reality providing apparatus can be widened, so that an expansion of market size of the augmented reality technology can be achieved.

For example, Patent Literature 2 describes a method in which a person included in a captured image is detected and CG costume is superimposed on the person. According to the method, it becomes possible to display in consideration of a person who is photographed by a camera of an augmented reality providing apparatus. However, the method of Patent Literature 2 needs to continuously superimpose CG on a person who goes around, so that a configuration of a system becomes complicated. Accordingly, a general user cannot use it without a burden.

Patent Literature 3 is a technique for displaying CG of a person on a virtual space, and has nothing to do with an augmented reality providing apparatus.

Patent Literature 4 relates to a system for detecting a face position and a face direction of a person, and has nothing to do with an augmented reality providing apparatus.

Patent Literature 5 relates to a technique in which a face position and a face direction of a person in a three dimensional space is used to determine whether persons are facing each other and an attribute value is allocated to the person according to a determination result to associate a unique ID with the attribute value of each person, and has nothing to do with an augmented reality providing apparatus.

In the meantime, when a projector projecting a three dimensional image at a particular position becomes possible to project in consideration of a person who views the image without being limited to the augmented reality providing apparatus, the use of the projector can be widened. Patent Literatures 1 to 5 do not disclose techniques that can implement such a projector.

CITATION LIST

Patent Literature

Patent Literature 1 JP-A-2005-174021
Patent Literature 2 JP-A-2009-289035
Patent Literature 3 JP-A-2000-331190
Patent Literature 4 JP-A-2007-026073
Patent Literature 5 JP-A-2010-044448

SUMMARY OF INVENTION

Technical Problem

The present invention has been made in consideration of the above circumstances and an object of the present invention is to provide an information presentation device, information presentation method and an information presentation program having improved convenience.

Solution to Problem

An information presentation device of the present invention is an information presentation device that presents information to a person in real space, includes: a control unit that performs a control either to superimpose the information on a reality space image captured by the imaging element to be displayed on a display unit or to project the information on a position of the reality space; a line-of-sight detection unit that detects a line-of-sight of a person included in the reality space image captured by the imaging element; and an information presentation position determination unit that determines a superimposing position of the information or the position on the basis of the detected line-of-sight by the line-of-sight detection unit.

Each of a digital camera and a head mount display of the present invention includes the respective units of the information presentation device, the imaging element, and the display unit, and the control unit performs the control to superimpose the information on the reality space image captured by the imaging element to be displayed on the display unit.

A projector of the present invention is a projector includes the respective units of the information presentation device and the imaging element, and the control unit performs the control to project the information on a position of the reality space.

An information presentation method of the present invention is an information presentation method in which information is presented to a person in real space, includes: a control step of performing a control either to superimpose the information on a reality space image captured by the imaging element to be displayed on a display unit or to project the information on a position of the reality space; a line-of-sight detection step of detecting a line-of-sight of a person included in the reality space image captured by the imaging element; and an information presentation position determination step of determining information presentation position to determine a superimposing position of the information or the position on the basis of the detected line-of-sight by the line-of-sight detection unit.

An information presentation program of the present invention is a program that causes a computer to execute the respective steps of the information presentation method.

Advantageous Effects of Invention

According to the present invention, it is possible to provide an information presentation device, an information presentation method and an information presentation program that are highly convenient.

BRIEF DESCRIPTION OF DRAWINGS

FIG. 6 is a view illustrating an example of a first table (in a case where the number of persons is three) recorded in a database 10a.

FIG. 10 is a view illustrating an example of a second table recorded in a database 10a of the digital camera illustrated in FIG. 9.

DESCRIPTION OF EMBODIMENTS

Hereinafter, a digital camera that corresponds to an embodiment of an information presentation device of the present invention with reference to the accompanying drawings.

Figure 1:
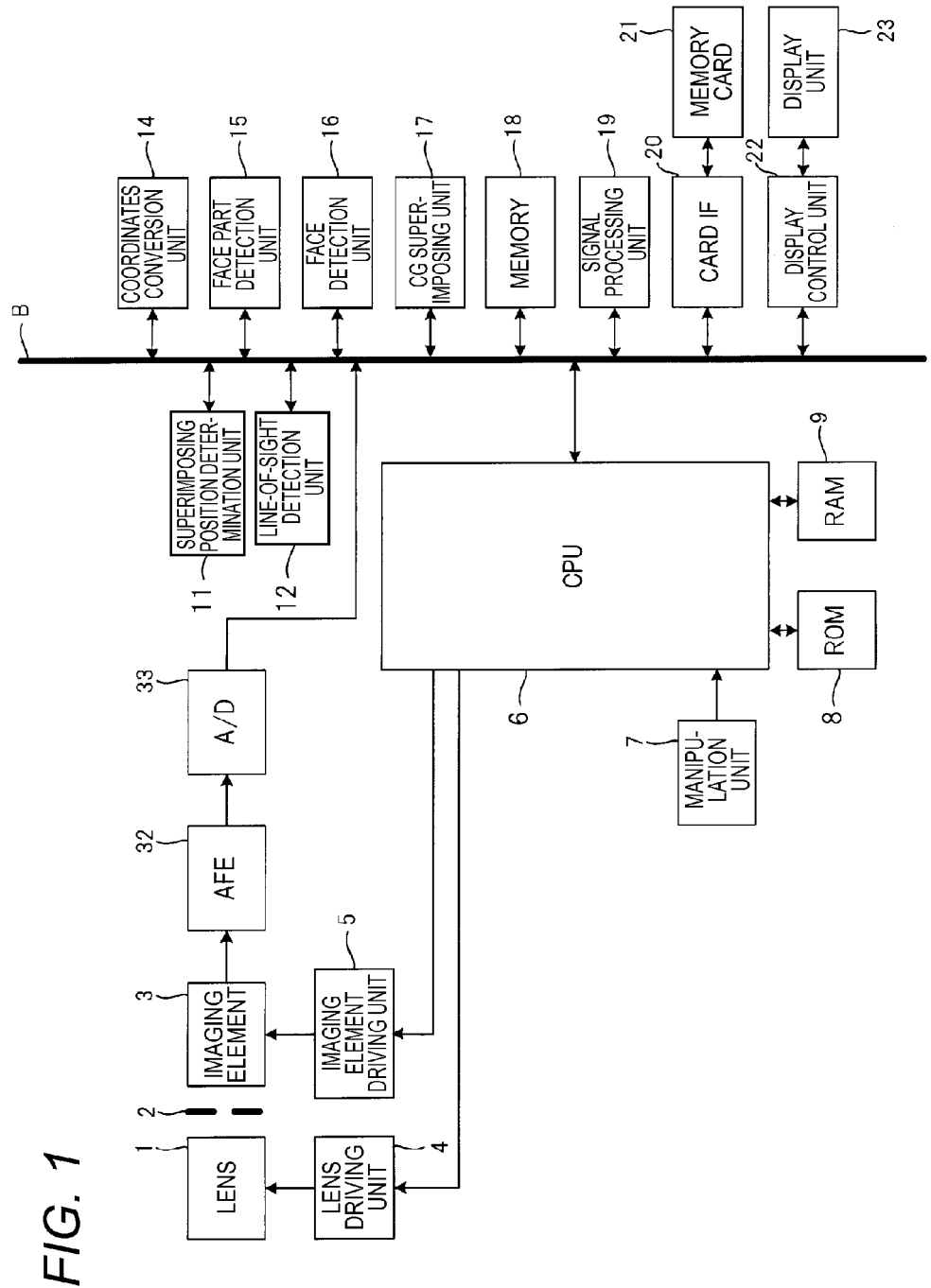
FIG. 1 is a view illustrating a schematic configuration of a digital camera for explaining an embodiment of the present invention.

FIG. 1 is a view illustrating a schematic configuration of a digital camera for explaining an embodiment of the present invention. The digital camera is equipped with an augmented reality mode in which information such as a virtual object (computer graphic; CG) is superimposed on a reality space image (captured image) obtained by photographing a real space to be displayed to provide an augmented reality to a user.

An image capturing system of the digital camera illustrated in FIG. 1 includes a photographing lens 1 including such as focus lens or a zoom lens, an aperture 2 provided at the rear side of the photographing lens 1, an imaging element 3, such as a CCD type or MOS type imaging element, provided at the rear side of the aperture 2, an analog front end ("AFE") 32 which performs an analog signal processing on a signal outputted from the imaging element 3, an AD conversion unit 33 which digitally converts an output signal of the AFE 32 to be output, a lens driving unit 4 which controls the movement of the focus lens or the zoom lens of the photographing lens 1, and an imaging element driving unit 5 which controls the driving of the imaging element 3. A captured image signal in a digital form output from the AD conversion unit 33 is output to a bus B.

The lens driving unit 4, the imaging element driving unit 5, the AFE 32 and the AD conversion unit 33 are controlled by a system control unit ("CPU") 6 which comprehensively controls the entirety of the digital camera. The CPU 6 is connected with a manipulation unit 7 for various manipulation of the digital camera, a ROM 8 in which various programs executed by the CPU 6 are stored, and a RAM 9 serving as a work memory of the CPU 6. In addition, the CPU 6 is connected to the bus B.

An electric control system of the digital camera illustrated in FIG. 1 includes the CPU 6, a superimposing position determination unit 11, a line-of-sight detection unit 12, a coordinates conversion unit 14, a face part detection unit 15, a face detection unit 16, a CG superimposing unit 17, a memory 18, a signal processing unit 19, a card interface 20 which controls a memory card (recording medium) 21, and a display control unit 22 which controls a display unit 23 such as a liquid crystal panel or an organic EL panel, and these components are connected with each other through the bus B and controlled by the CPU 6.

The superimposing position determination unit 11, the line-of-sight detection unit 12, the coordinates conversion unit 14, the face part detection unit 15, the face detection unit 16, and the CG superimposing unit 17 are functional blocks implemented by execution of the information presentation program stored in the ROM 8 by the CPU 6 corresponding to a computer.

The signal processing unit 19 is configured by a digital single processor ("DSP"), and performs an image processing, such as synchronization processing or γ correction processing, on the captured image signal output from the AD conversion unit 33 and temporarily stored in the memory 18 to produce a captured image data.

The face detection unit 16 acquires the captured image data produced from the signal processing unit 19 and performs a face detection process on the acquired captured image data.

The face part detection unit 15 detects parts (hereinafter, as an example, the parts are set as two eyes and a mouth) of the face detected by the face detection unit 16.

The coordinates conversion unit 14 converts coordinates of each point of a triangle in a two dimensional plane that connects each of centers of two eyes and a center of a mouth detected by the face part detection unit 15 into coordinates in a three dimensional space (global coordinates).

The line-of-sight detection unit 12 detects a line-of-sight (a vector having a direction and a size in a three dimensional space) of a person on the basis of the global coordinates of the triangle after being converted by the coordinates conversion unit 14.

Figure 2:
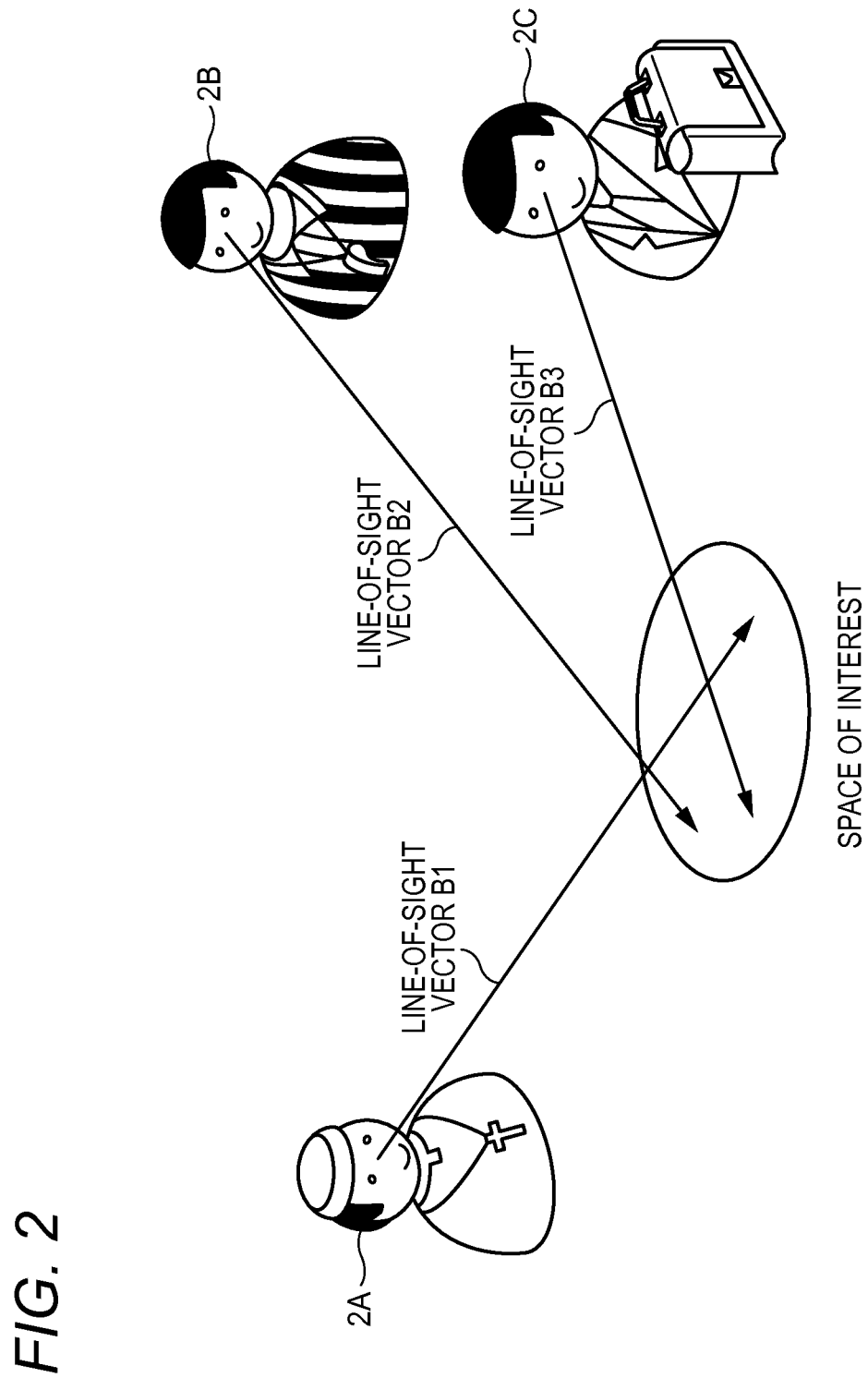
FIG. 2 is a view for explaining a line-of-sight vector of a person.

For example, the line-of-sight detection unit 12 calculates a normal vector of the triangle in the three dimensional space of which starting point corresponds to a midpoint of points corresponding to the two eyes among the respective points of the triangle converted by the coordinates conversion unit 14, and detects the normal vector as the line-of-sight. As illustrated in FIG. 2, when three persons 2A, 2B, and 2C are included in the captured image data, the line-of-sight detection unit 12 calculates a normal vector (line-of-sight vector) B1 to B3 of a triangle which connects two eyes and a mouth of each person.

The superimposing position determination unit 11 calculates the center of gravity of the region of interest on the three dimensional space that corresponds to a region where a plurality of lines-of-sight are watching on the basis of the plurality of lines-of-sight detected by the line-of-sight detection unit 12. Also, the superimposing position determination unit 11 determines the position of the center of gravity as a position (point of interest) on which the virtual object is to be superimposed.

Figure 3:
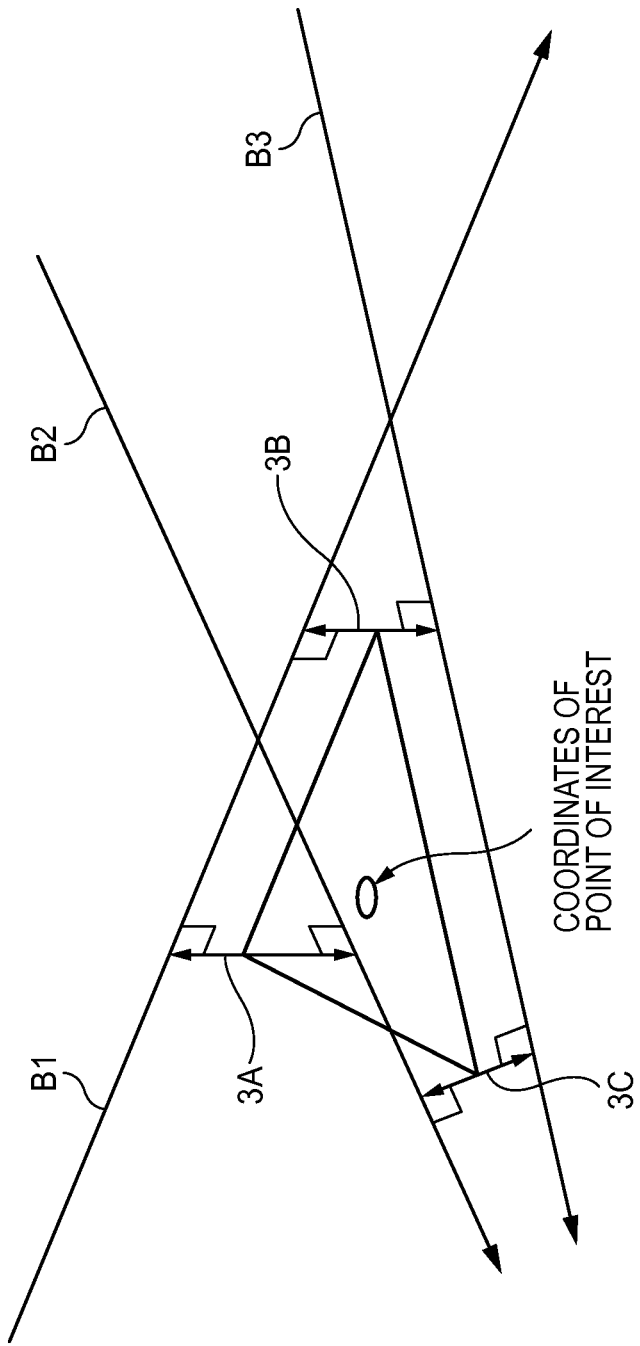
FIG. 3 is a view for explaining a method for determining a superimposing position of a virtual object when three lines-of-sight illustrated in FIG. 2 are detected by a line-of-sight detection unit 12.

FIG. 3 is a view for explaining a determination method of a superimposing position of a virtual object when three lines-of-sight B1 to B3 illustrated in FIG. 2 are detected by a line-of-sight detection unit 12.

The superimposing position determination unit 11 calculates the shortest line segment 3A among the line segments which connect the line-of-sight vector B1 and line-of-sight vector B2 and are perpendicular to both the line-of-sight vector B1 and line-of-sight vector B2 in a three dimensional space defined by the global coordinates.

Further, the superimposing position determination unit 11 calculates the shortest line segment 3B among the line segments which connect the line-of-sight vector B1 and line-of-sight vector B3 and are perpendicular to both the line-of-sight vector B1 and line-of-sight vector B3.

Still further, the superimposing position determination unit 11 calculates the shortest line segment 3C among the line segments which connect the line-of-sight vector B2 and line-of-sight vector B3 and are perpendicular to both the line-of-sight vector B2 and line-of-sight vector B3.

Subsequently, the superimposing position determination unit 11 deletes the line segment of which length is a threshold or more among the calculated line segments 3A to 3C. If there was a line segment of which length is a threshold or more, it may be judged that two line-of-sight vectors connected by the line segment are widely spaced apart from each other. For this reason, such a line segment is not utilized to determine a position to which the virtual object is superimposed to prevent the reduction of the calculation accuracy of the superimposing position of the virtual object.

When there remain three or more line segments after the line segment of which length is a threshold or more is deleted, the superimposing position determination unit 11 defines a polygon formed by connecting the respective midpoints of the three or more line segments as a region of interest and sets the center of gravity of the region of interest as the coordinates for superimposing the virtual object.

Further, when there remain two line segments after the line segment of which length is a threshold or more is deleted, the superimposing position determination unit 11 defines a midpoint of the line segment which connects the respective midpoints of the two line segments as the coordinates for superimposing the virtual object. Still further, when there remains one line segment after the line segment of which length is a threshold or more is deleted, the superimposing position determination unit 11 defines a midpoint of the line segment as the coordinates for superimposing the virtual object.

When all the lengths of the line segments 3A to 3C are less than the threshold as illustrated in FIG. 3, the center of gravity of a triangle which connects a midpoint of the line segment 3A, a midpoint of the line segment 3B, and a midpoint of the line segment 3C becomes coordinates (point of interest coordinates) for superimposing the virtual object.

The CG superimposing unit 17 converts the point of interest coordinates determined by the superimposing position determination unit 11 into a two dimensional coordinates and generates an augmented reality image data in which the virtual object is combined with the converted coordinates and instructs the display control unit 22 to display images based on the augmented reality image data on the display unit 23.

The display control unit 22 controls the display unit 23 to display the images based on the augmented reality image data instructed from the CG superimposing unit 17.

Figure 4:
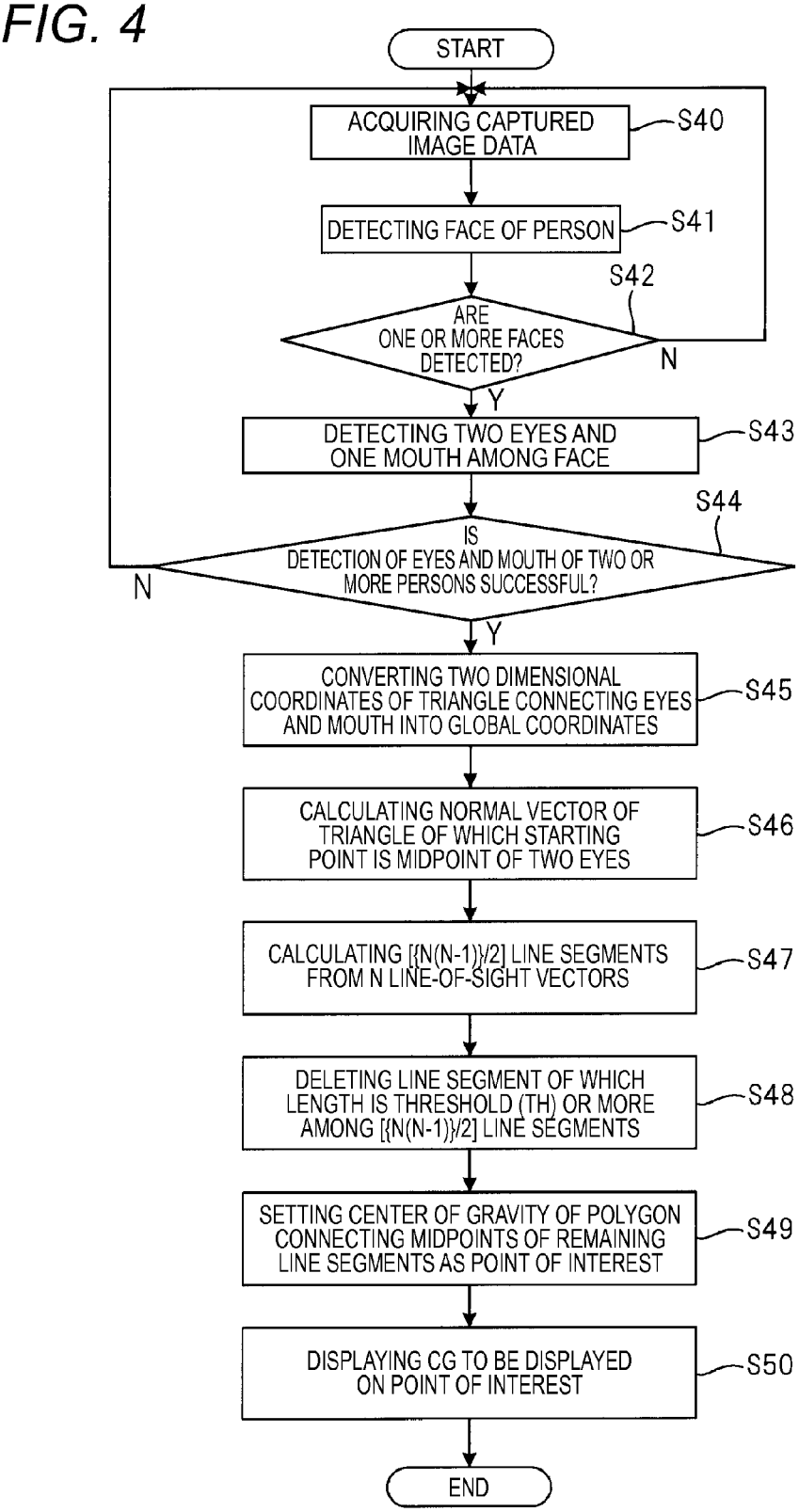
FIG. 4 is a flowchart for explaining an operation when the digital camera illustrated in FIG. 1 is in an augmented reality mode.

Hereinafter, an operation of the digital camera illustrated in FIG. 1 when it is in an augmented reality mode. FIG. 4 is a flowchart for explaining an operation when the digital camera illustrated in FIG. 1 is in an augmented reality mode.

When it is set as an augmented reality mode, the CPU 6 controls the imaging element driving unit 5 to start the photographing of moving images by the imaging element 3.

When the photographing of moving images is started by the imaging element 3, the signal processing unit 19 performs an image processing of the captured image signal sequentially output from the imaging element 3 to generate the captured image data. The generated captured image data is sequentially displayed on the display unit 23 by the control of the display control unit 22. Accordingly, the user can identify the reality space image being photographed as a live view image.

In the meantime, when the captured image data is generated, the face detection unit 16 acquires the captured image data (step S40) and performs a face detection process on the acquired captured image data (step S41).

When one or more faces are detected as a result of the face detection process (step S42: Yes), the face part detection unit 15 detects two eyes and one mouth among the detected faces (step S43). When one or more faces are not detected as a result of the face detection process (step S42: No), the process returns to step S40, and a next frame of the moving image is acquired and the face detection process is performed on the frame.

When a part group, which is constituted with two eyes and a mouth, for two or more persons was detected at a processing of step S43 (step S44: Yes), a processing after step S45 is performed. In the meantime, when a part group for two or more persons was not detected (step S44: No), a next frame of the moving image is acquired at step S40 and the face detection process is performed on the frame.

At step S45, the coordinates conversion unit 14 calculates the coordinates of each vertex of a triangle (part triangle) connecting each of centers of two eyes line and a center of the mouth for each part group detected at step S43 and converts the coordinates into coordinates (global coordinates) of a three dimensional space (step S45).

Subsequently, the line-of-sight detection unit 12 calculates a normal vector (line-of-sight vector) of which starting point is a midpoint of the line segment which connects two eyes forming the part triangle for each part triangle after being converted to the global coordinates (step S46). At this time, N (N is a natural number that is 2 or more) line-of-sight vectors are calculated.

Subsequently, the superimposing position determination unit 11 performs a process which calculates a shortest line segment among the line segments that connect one line-of-sight vector and each of the other N–1 line-of-sight vectors and are perpendicular to both the line-of-sight vectors of for each of the N line-of-sight vectors. Accordingly, the [{N(N–1)}/2] line segments are calculated (step S47).

Subsequently, the superimposing position determination unit 11 deletes a line segment of which length is a threshold (TH) or more among the [{N(N–1)}/2] line segments (step S48). In the meantime, when all line segments are deleted at step 48, the process proceeds to step S40. In the meantime, when one or more line segments are remained at step 48, the process proceeds to step S49.

At step S49, when there remain three or more line segments, the superimposing position determination unit 11 sets the center of gravity of a polygon connecting the midpoints of each of three line segments as the point of interest coordinates for superimposing the virtual object. Further, when there remain two line segments, the superimposing position determination unit 11 sets the midpoint of the line segment connecting the midpoints of two line segments as the point of interest coordinates for superimposing the virtual object. Still further, when there remains one line segment, the superimposing position determination unit 11 sets the midpoint of the line segment as the point of interest coordinates for superimposing the virtual object.

Subsequently, the CG superimposing unit 17 converts the point of interest coordinates calculated at step S49 into two dimensional coordinates. Also, the CG superimposing unit 17 produces an augmented reality image data in which the virtual object is combined with the two dimensional coordinates and allows an image based on the augmented reality image data to be displayed on the display unit 23 by the display control unit 22 (step S50).

After step S50, when an instruction is issued to photograph a still image through an manipulation unit 17, the imaging element 3 photographs a still image and accordingly, a captured image data is generated by the signal processing unit 19. Then, a process of step S40 to step S49 is performed, and the generated augmented reality image data are displayed on the display unit 23 and simultaneously, the augmented reality image data is recorded on a memory card 21 through a card interface 20.

As described above, according to the digital camera, a superimposing position of a virtual object with respect to the reality space image displayed on the display unit 23 can be determined according to a line-of-sight of a person who is photographed by the imaging element 3. For this reason, an augmented reality considering a target being photographed may also be provided, so that it is possible to widen the use of an augmented reality providing apparatus.

Further, the digital camera has a simple configuration such that the line-of-sight of the person photographed is detected and simply a superimposing position of the virtual object is determined according to the line-of-sight. For this reason, a complicated system, as described in Patent Literature 2, in which a server computer which receives data from a portable display device and returns an image data for superimposing based on the received data is used is not needed. Therefore, a technique of the present invention can be simply incorporated in an equipment such as a digital camera that can be readily purchased by a general user.

In the meantime, in the description as above, a processing of from step S40 to step S50 is performed during the display of the live view image before an instruction to photograph the still image is issued. However, the processing may be performed only when the instruction to photograph the still image is issued.

For example, after the photographing is completed, the digital camera performs a processing of steps S40 to S49 illustrated in FIG. 4 to calculate the coordinates of point of interest for the captured image data generated by the signal processing unit 19. Thereafter, the digital camera generates the augmented reality image data in which the virtual object is combined with the coordinates, displays the augmented reality image data on the display unit 23 and simultaneously, records the augmented reality image data in the memory card 21.

According to this configuration, a process is ended without performing a process of the flowchart illustrated in FIG. 4 during the display of the live view, so that it becomes possible to reduce power consumption of the digital camera.

Further, the digital camera may perform the process illustrated in FIG. 4 on the captured image data for which photographing is ended and which is recorded in the memory card 21 or the captured image data photographed by another camera to generate the augmented reality image data.

By doing this, various captured image data can be converted into the augmented reality image data without being limited to the captured image data obtained with photographing by the digital camera, so that it is possible to increase the added value of the digital camera.

In the meantime, when a plurality of persons orient towards quite different directions, it is unable to determine the point of interest. Therefore, the precondition of the digital camera is that the digital camera is driven to start a photographing after a photographer instructs a person corresponding to a subject to orient towards a direction to be gazed using such as fingers.

Hereinafter, a modified example of the digital camera illustrated in FIG. 1 will be described.

Figure 5:
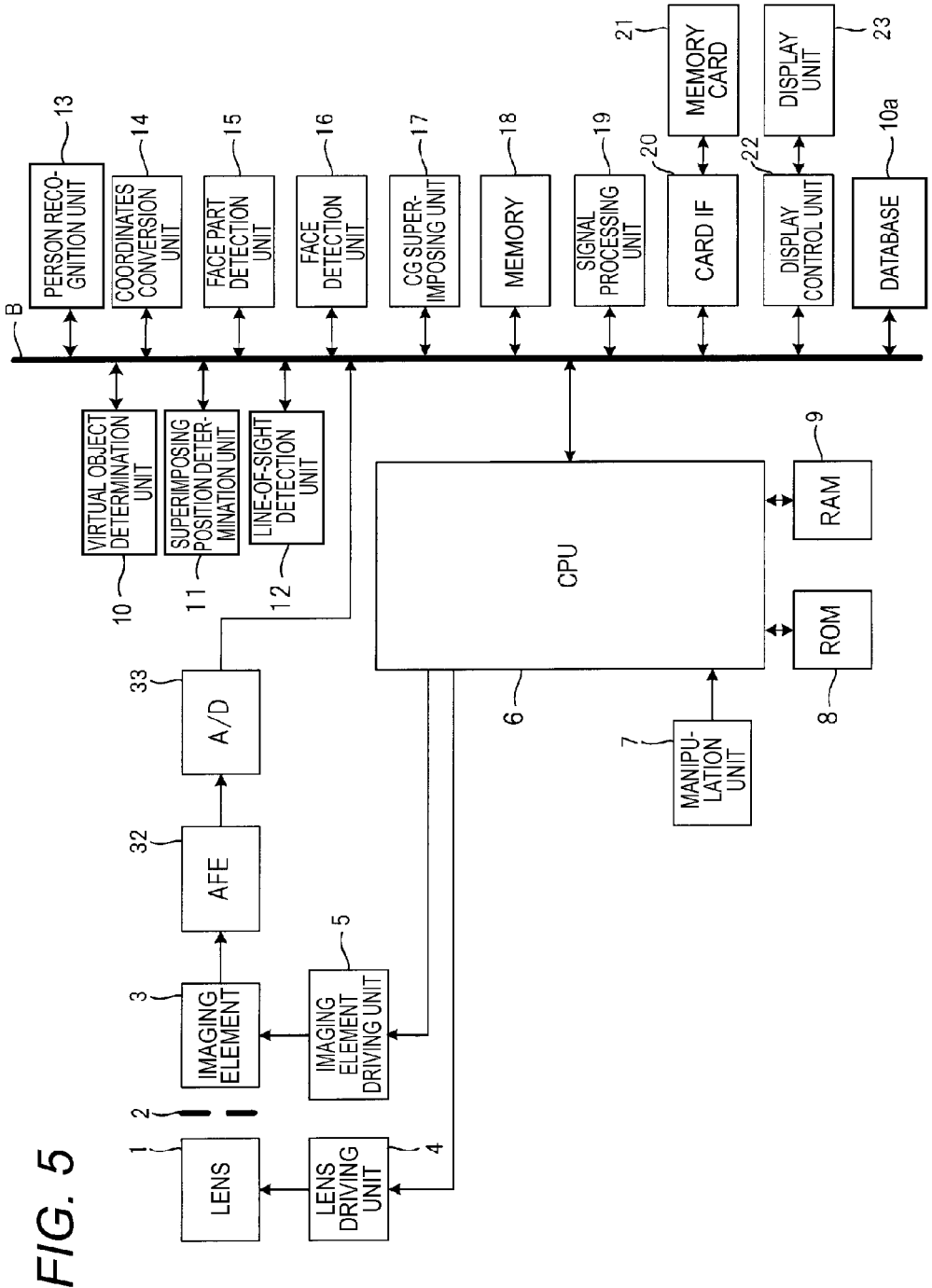
FIG. 5 is a view illustrating a first modified example of the digital camera illustrated in FIG. 1.

FIG. 5 is a view illustrating a first modified example of the digital camera illustrated in FIG. 1. The digital camera illustrated in FIG. 5 has the same configuration as that illustrated in FIG. 1 except that a virtual object determination unit 10, a person recognition unit 13 and a database 10*a* are added. The virtual object determination unit 10 and the person recognition unit 13 are functional blocks implemented by the execution of an information presentation program by the CPU 6.

The person recognition unit 13 detects each person among the captured image data generated by the signal processing unit 19 and determines an attribute of the person.

The database 10*a* has a person attribute table in which an image and the attribute of the person are corresponded with each other recorded therein. The person recognition unit 13 determines an attribute of an image of a person extracted among the captured image data based on the image of the extracted person and the person attribute table. Here, the attribute of the person refers to the information indicating at least one of sex, age, occupation, name, and costume.

The virtual object determination unit 10 determines the contents of a virtual object based on a determination result of the attributes by the person recognition unit 13 and the database 10*a*.

The database 10*a* has a first table in which the attributes of the persons and the contents of the virtual objects are corresponded with each other recorded therein. The first table is prepared in accordance with the number of persons. When there are plural persons, the data indicating the content of one virtual object for a combination of the attributes of the plural persons is recorded therein.

FIG. 6 is a view illustrating an example of a first table (in a case where the number of persons is three) recorded in a database 10a.

As illustrated in FIG. 6, a car is corresponded to a combination of three persons of a 30 to 35-year-old man, a 30 to 35-year-old woman, and a 0 to 5 year-old man as the content of the virtual object. Further, a doll is corresponded to a combination of three persons of a 30 to 35-year-old man, a 30 to 35-year-old woman, and a 0 to 5-year-old woman as the content of the virtual object. Still further, a soccer ball is corresponded to a combination of three persons of a 20 to 25-year-old man who wears a uniform, another 20 to 25-year-old man who wears a uniform, and a 20 to 25-year-old man who wears a referee uniform as the content of the virtual object.

For example, when the attributes of the three persons determined by the person recognition unit 13 are a 20 to 25-year-old man who wears a uniform, another 20 to 25-year-old man who wears a uniform, and a 20 to 25 years old man who wears a referee uniform, the virtual object determination unit 10 determines the soccer ball as a virtual object according to the attributes of the persons and the database 10A.

Figure 7:
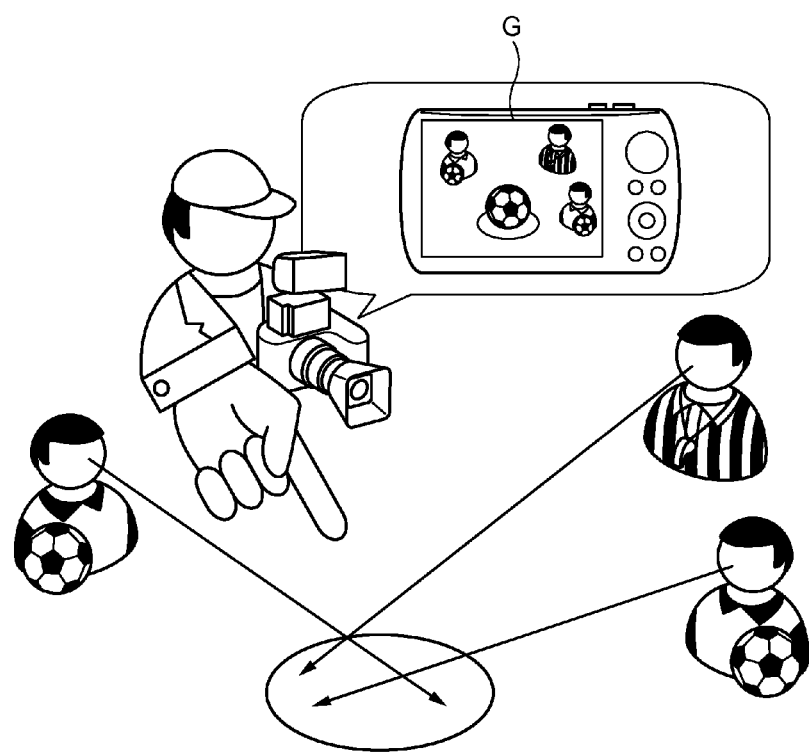
FIG. 7 is a view for explaining an operation when the digital camera illustrated in FIG. 5 is in an augmented reality mode.

As a result, an image generated based on the augmented reality image data generated by the CG superimposing unit 17 becomes an image as in an image G illustrated in FIG. 7, and a virtual object having a high degree of correlation with a person being photographed is superimposed and displayed on a region where the person who is being photographed gazes.

Figure 8:
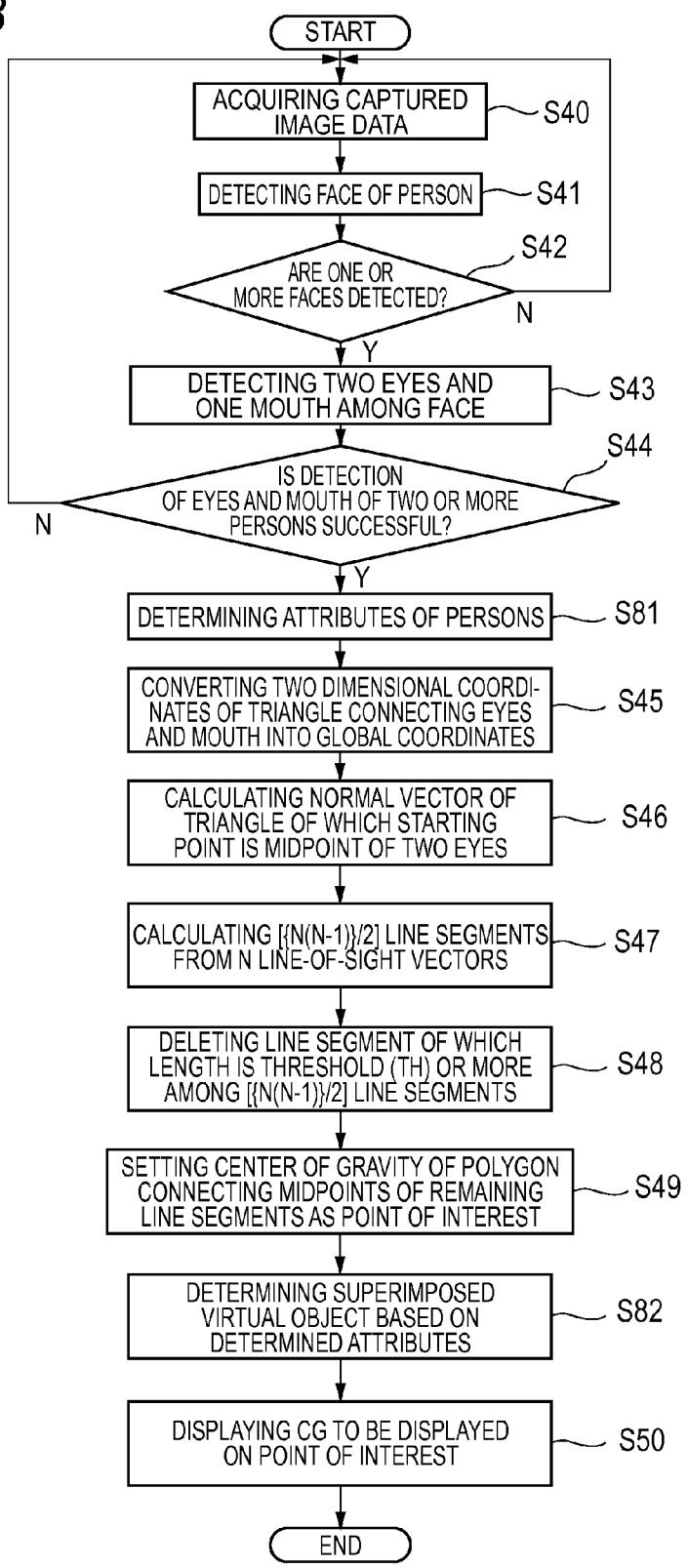
FIG. 8 is a flowchart for explaining an operation when the digital camera illustrated in FIG. 5 is in an augmented reality mode.

FIG. 8 is a flowchart for explaining an operation when the digital camera illustrated in FIG. 5 is in an augmented reality mode. In FIG. 5, the same processing as that of FIG. 4 is denoted by the same reference numerals and descriptions thereof will be omitted.

When it is determined that the eyes and mouth of two or more persons are detected, the person recognition unit 13 recognizes each person for the captured image data in which a face is detected at step S41 and determines the attribute of the person included in the captured image data (step S81).

After step S81, a process of step S45 to step S49 is performed and then, the virtual object determination unit 10 determines the virtual object based on the attributes determined at step S81 and the database 10a (step S82).

After step S82, the CG superimposing unit 17 generates the augmented reality image data in which the virtual object determined at step S82 is superimposed on the point of interest determined at step S49 and causes an image based on the augmented reality image data to be displayed on the display unit 23 at step S50.

Figure 9:
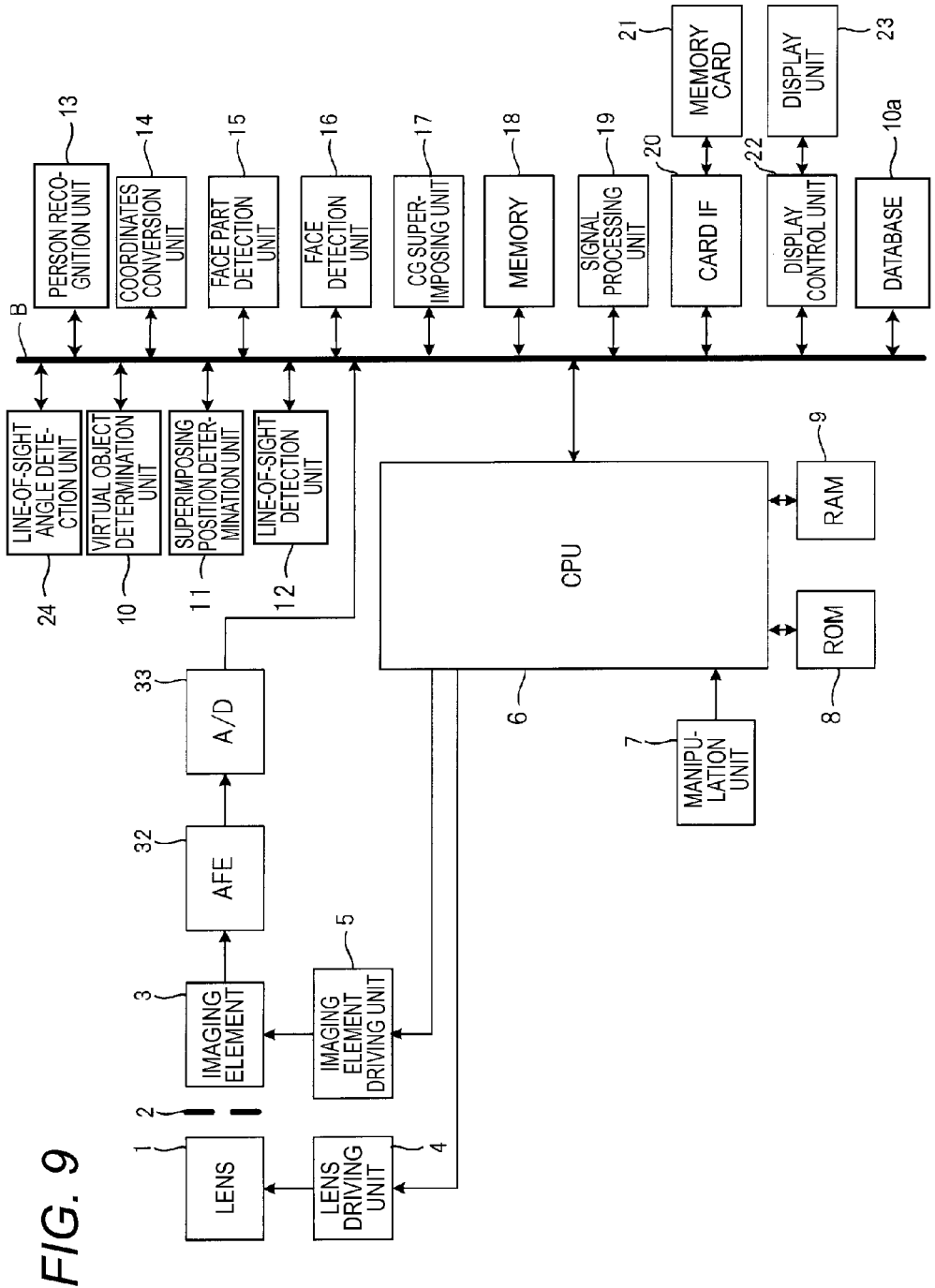
FIG. 9 is a view illustrating a second modified example of the digital camera illustrated in FIG. 1.

As described above, according to the digital camera of the first modified example, it is possible to determine the content of the virtual object to be superimposed on the reality space image according to the attribute of the person photographed. For this reason, the virtual object may be set as one having a high correlation with the person being photographed, so that an augmented reality image without providing a sense of incompatibility can be obtained even though the virtual object is not designated by a photographer FIG. 9 is a view illustrating a second modified example of the digital camera illustrated in FIG. 1. The digital camera illustrated in FIG. 9 has the same configuration as that illustrated in FIG. 5 except that a line-of-sight angle detection unit 24 is added. The digital camera illustrated in FIG. 9 has two-person augmented reality mode which requires the number of person to be photographed be two as a prerequisite. The line-of-sight angle detection unit 24 is a functional block implemented by the execution of the information presentation program by the CPU 6.

When being in a two-person augmented reality mode, the line-of-sight angle detection unit 24 projects two line-of-sight vectors detected by the line-of-sight detection unit 12 on a two dimensional plane (a plane corresponding to the captured image) and calculates an angle θ formed by two projected line-of-sight vectors.

When being in the two-person augmented reality mode, the superimposing position determination unit 11 converts a global coordinates of an intersection point of the two line-of-sight vectors into two dimensional coordinates and determines the two dimensional coordinates as a position (point of interest) at which the CG is to be superimposed.

When being in an augmented reality mode other than the two-person augmented reality mode, the superimposing position determination unit 11 determines the point of interest according to the N line-of-sight vectors detected by the line-of-sight detection unit 12, as described above.

When in a state of the two-person augmented reality mode, the virtual object determination unit 10 determines the contents (types and size) of the virtual object based on the angle θ calculated by the line-of-sight angle detection unit 24 and the attributes of two persons determined by the person recognition unit 13.

The database 10a in the digital camera illustrated in FIG. 9 has a second table in which a combination of the attributes of two persons, an angle θ formed by the two persons and contents (type and size) of the virtual object are corresponded with each other recorded therein.

FIG. 10 is a view illustrating an example of a second table recorded in a database 10a of the digital camera illustrated in FIG. 9.

As illustrated in FIG. 10, a combination of two persons of a 30 to 35-year-old man who wears a tuxedo and a 30 to 35-year-old woman who wears a wedding dress, information of $0 \leq \theta \leq \pi/8$, and "a large heart" as the contents of the virtual object are recorded to be corresponded with each other.

Further, a combination of two persons of a 30 to 35-year-old man who wears a tuxedo and a 30 to 35-year-old woman who wears a wedding dress, the information of $\pi/8 \leq \theta \leq \pi/4$, and "a big heart" as the contents of the virtual object are recorded to be corresponded with each other.

Still further, a combination of two persons of a 20 to 25-year-old man who wears a uniform and another 20 to 25-year-old man who wears a uniform, the information of $0 \leq \theta \leq \pi/8$, and "a flare" as the contents of the virtual object are recorded to be corresponded with each other.

Figure 11A:
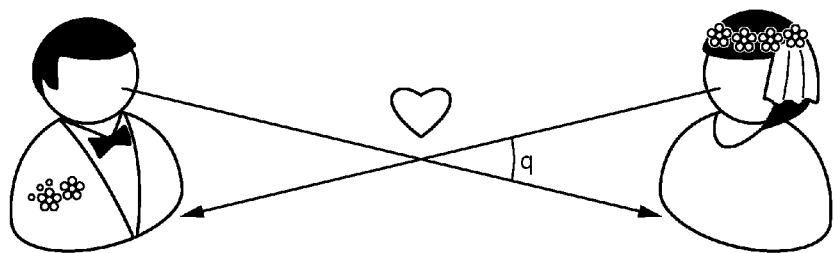
FIGS. 11A to 11C are views for explaining an operation when the digital camera illustrated in FIG. 9 is in a two-person augmented reality mode.

For example, in a case where the attributes determined by person recognition unit 13 are a combination of a 30 to 35-year-old man who wears a tuxedo and a 30 to 35-year-old woman who wears a wedding dress and an angle θ calculated by the line-of-sight angle detection unit 24 is thirty degrees, a small heart is superimposed and displayed near the intersection point of the lines-of-sight of the two persons included in the photographed reality space image as illustrated in FIG. 11A.

Figure 11B:
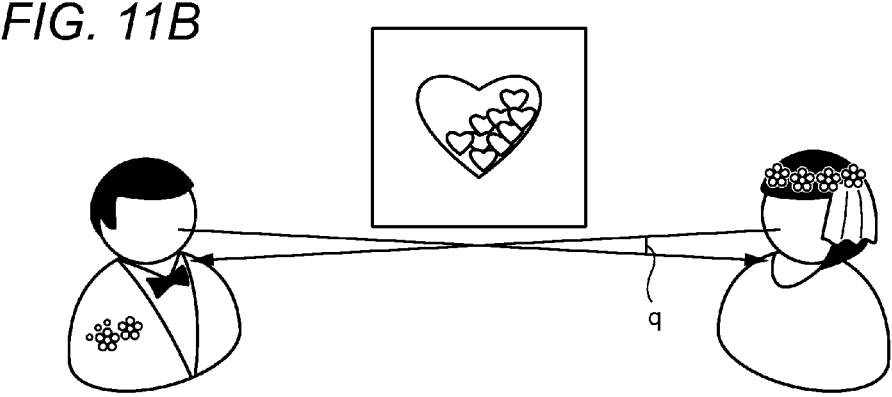

Further, for example, in a case where the attributes determined by person recognition unit 13 are a combination of a 30 to 35 years old man who wears a tuxedo and a 30 to 35 years old woman who wears a wedding dress, an angle θ calculated by the line-of-sight angle detection unit 24 is five degrees, a large heart is displayed to be superimposed at the near the intersection point of the lines-of-sight of the two persons included in the photographed reality space image as illustrated in FIG. 11B.

Figure 11C:
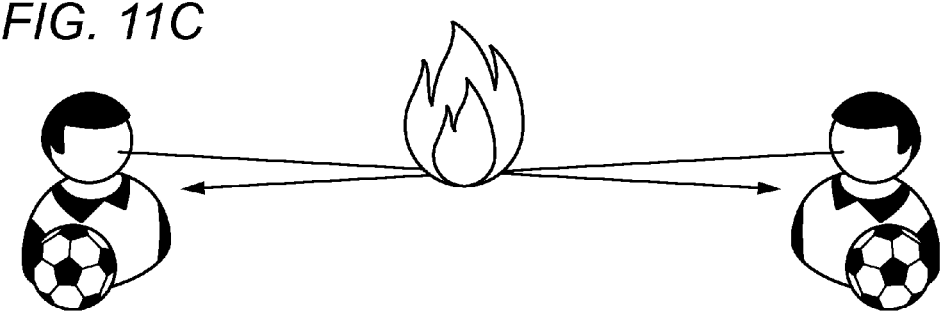

Still further, for example, in a case where the attributes determined by person recognition unit 13 are a combination of a 20 to 25-year-old man who wears a uniform and another 20 to 25-year-old man who wears a uniform and an angle θ calculated by the line-of-sight angle detection unit 24 is five degrees, a flare is superimposed and displayed near the intersection point of the lines-of-sights of the two persons included in the photographed reality space image as illustrated in FIG. 11C.

Figure 12:
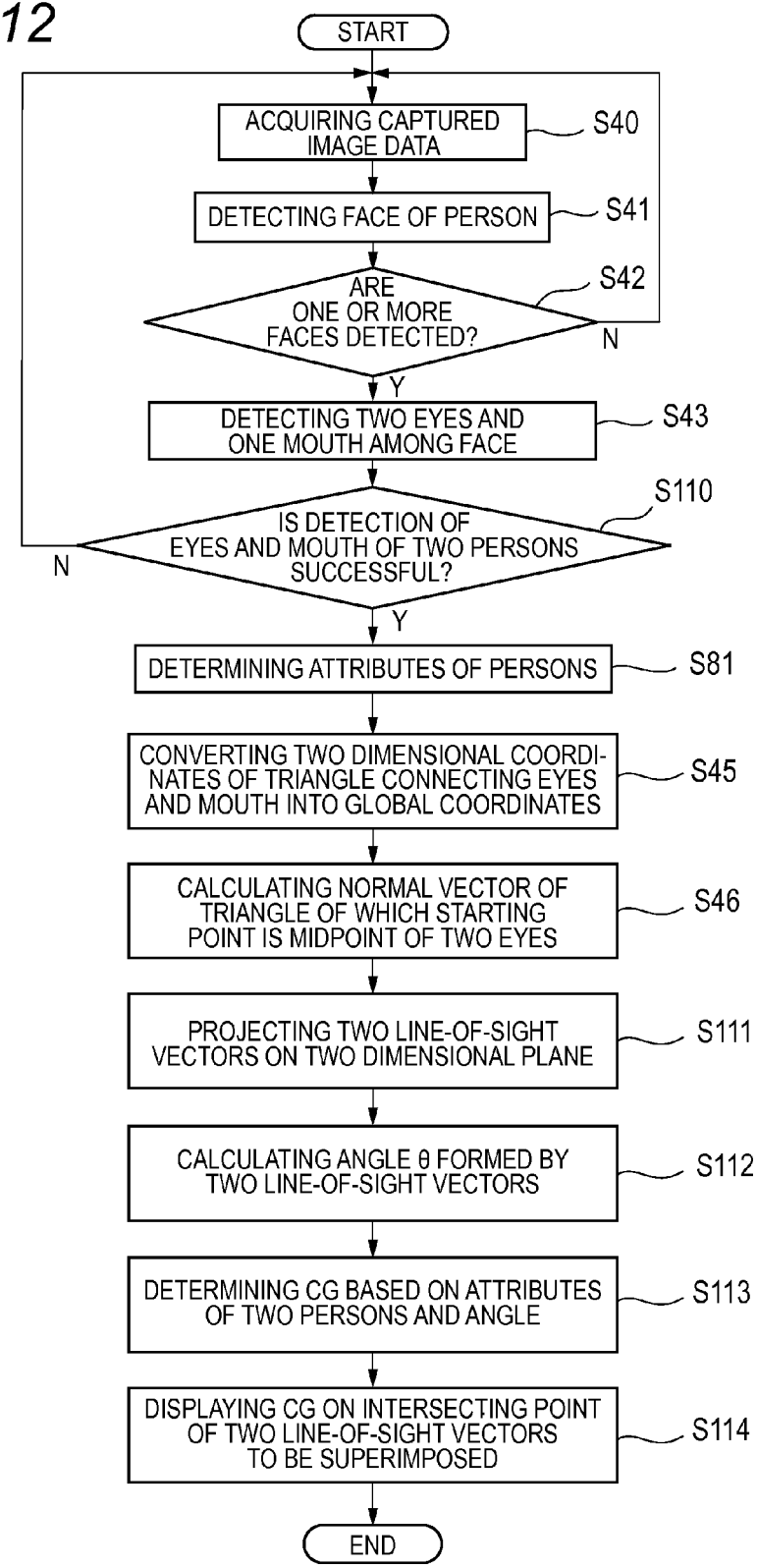
FIG. 12 is a flowchart for explaining an operation when the digital camera illustrated in FIG. 9 is in a two-person augmented reality mode.

FIG. 12 is a flowchart for explaining an operation when the digital camera illustrated in FIG. 9 is in a two-person augmented reality mode. In FIG. 12, the same processing as that of FIG. 8 is denoted by the same reference numerals and descriptions thereof will be omitted.

At the processing of step S43, when it is determined that detecting the eyes and mouth of two persons is successful (step S110: Yes), step S81, step S45, and step S46 are sequentially performed.

After step S46, the line-of-sight angle detection unit 24 projects two line-of-sight vectors on the two dimensional plane calculated at step S46 (step S111), and calculates an angle θ formed by the two line-of-sight vectors projected (step S112).

Subsequently, the virtual object determination unit 10 determines the virtual object based on the attributes of the two persons determined at step S81, the angle θ calculated at step S112, and a second table recorded on the database 10a (step S113).

Subsequently, the superimposing position determination unit 11 calculates coordinates of the intersecting point of two line-of-sight vectors in global coordinates calculated at step S46 and sets the coordinates of the intersecting point as the point of interest.

Thereafter, the CG superimposing unit 17 converts the coordinates of the intersecting point into two dimensional coordinates, generates an augmented reality image data in which the virtual object determined at step S113 is combined at the converted coordinates of the intersecting point, and displays an image based on the augmented reality image data on the display unit 23 (step S114).

In the meantime, the operation in an augmented reality mode other than the two-person augmented reality mode is the same as illustrated in FIG. 8.

As described above, according to the digital camera of the second modified example, a type and a size of the virtual object to be superimposed on the reality space image can be determined depending on an angle formed by the attributes of and the lines-of-sight of the two persons. For this reason, as illustrated in FIGS. 11A to 11C, it is possible to superimpose and display the virtual object according to the feelings of the two persons and thus, an interesting augmented reality in which an intention of a person is reflected can be provided.

In the meantime, when being in a two-person augmented reality mode, the digital camera of the second modified example may omit the recognition of person. In this case, the virtual object to be superimposed and displayed is designated by a user, such that the virtual object determination unit 10 determines the size of the designated virtual object according to the angle θ calculated by the line-of-sight angle detection unit 24.

For example, when the user designates a heart as the virtual object and photographs two persons as illustrated in FIG. 11A, if the angle of the lines-of-sight of the two persons is large, the heart becomes smaller as in FIG. 11A, and if the angle of the lines-of-sight of the two persons is small, the heart becomes larger as in FIG. 11B.

As such, when the virtual object is predefined, the contents (size) of the virtual object can be determined only according to the angle θ formed by the lines-of-sight.

In the description so far, when two or more persons are included in the reality space image photographed by the imaging element 3, the virtual object is superimposed and displayed on the position according to the lines-of-sight of the persons. Hereinafter, even when only one person is included in the reality space image photographed by the imaging element 3, a method in which the virtual object is superimposed and displayed will be described.

Figure 13:
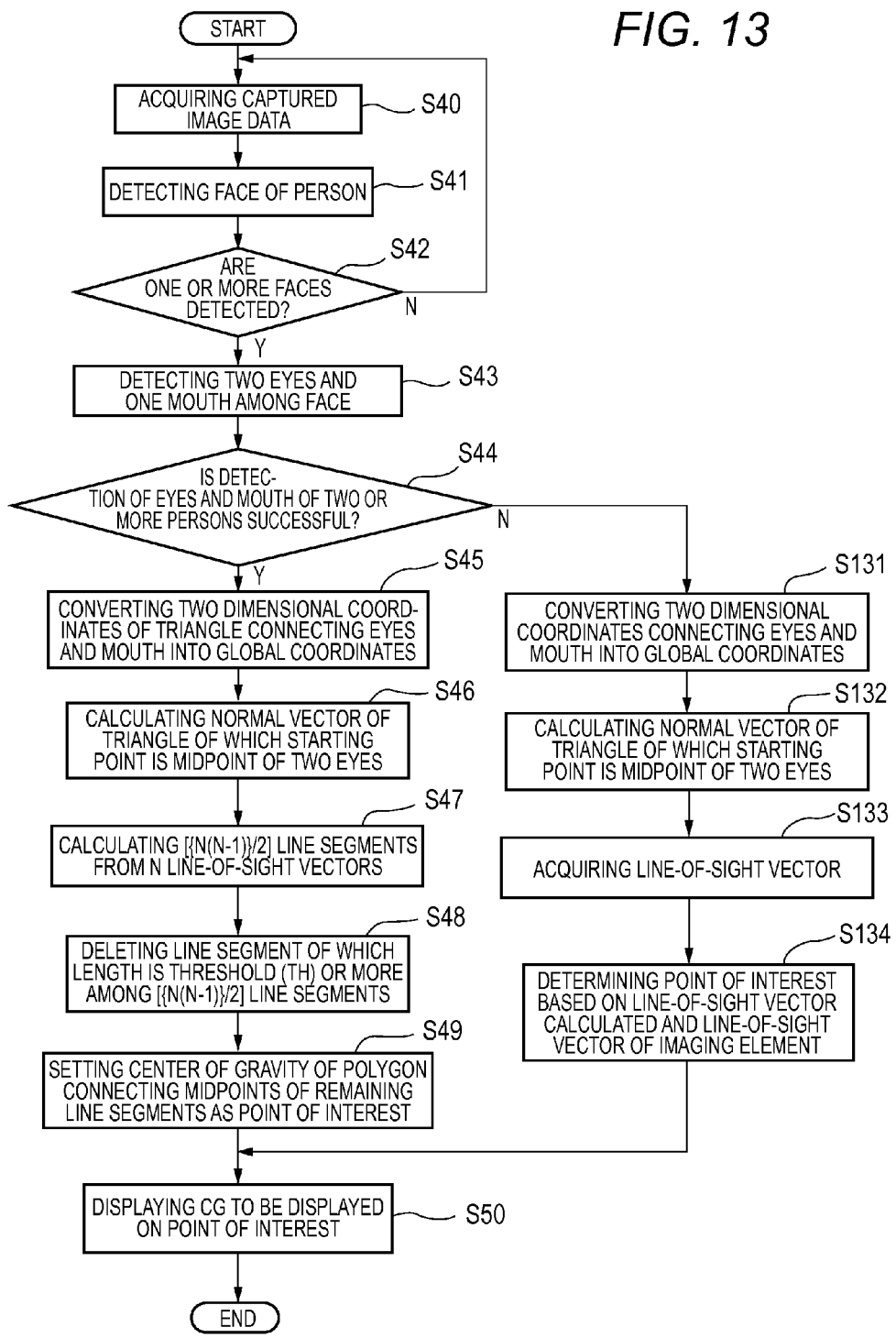
FIG. 13 is a flowchart for explaining a modified example of an operation when the digital camera illustrated in FIG. 1 is in an augmented reality mode.

FIG. 13 is a flowchart for explaining a modified example of an operation when the digital camera illustrated in FIG. 1 is in an augmented reality mode. In FIG. 13, the same processing as that of FIG. 3 is denoted by the same reference numerals and descriptions thereof will be omitted.

As a result of a processing of S43, when it is determined that the eyes and mouth of two or more persons are not detected in the captured image data, that is, only one person is included in the captured image data (step S44: No), the coordinates conversion unit 14 calculates the coordinates of each vertex of a triangle (part triangle) connecting the centers of each eye and the center of the mouth detected at step S43, and converts the calculated coordinates into the coordinates (global coordinates) of three dimensional space (step S131).

Subsequently, the line-of-sight detection unit 12 calculates a normal vector (line-of-sight vector) of the part triangle of which starting point is the midpoint of the line segment connecting the two eyes that constitute the part triangle after being converted into the global coordinates (step S132). At this time, one line-of-sight vector is calculated.

Subsequently, the line-of-sight detection unit 12 acquires the information of the line-of-sight vector of the imaging element 3 in photographing in order to obtain a captured image data for which the face detection is performed at step S41 (step S133). Since the line-of-sight vector of the imaging element 3 is coincident with an optical axis of the digital camera, the line-of-sight detection unit 12 calculates a straight line extending perpendicularly to the captured image data from a center of the captured image data as the line-of-sight vector of the imaging element 3 to acquire the information of line-of-sight vector of the imaging element 3.

Subsequently, the superimposing position determination unit 11 determines a position (point of interest) to which the virtual object is superimposed based on one line-of-sight vector calculated at step S132 and the line-of-sight vector of the imaging element 3 acquired at step S133 (step S134).

Specifically, the superimposing position determination unit 11 calculates a shortest line segment among line segments that connect one line-of-sight vector calculated at step S132 and the line-of-sight vector of the imaging element 3 acquired at step S133 and are in perpendicular to both the line-of-sight vectors and determines a midpoint of the calculated shortest line segment as a point of interest to which the virtual object is superimposed.

After step S134, the CG superimposing unit 17 produces an augmented reality image data in which the virtual object is combined with the point of interest, which is determined at step S134, of the captured image data and displays an image based on the augmented reality image data on the display unit 23, at step S50.

As described above, even when only one person is included in the reality space image obtained by photographing with the imaging element 3, a position to which the virtual object is to be superimposed can be determined based on the line-of-sight vector of the person included in the reality space image and the line-of-sight vector of the imaging element 3. In this case, the size of the virtual object may be changed according to an angle formed by the line-of-sight vector of the person included in the reality space image and the line-of-sight vector of the imaging element 3.

As described above, according to the digital cameras illustrated in FIG. 1, FIG. 5, and FIG. 9 and the digital camera which performs the operation illustrated in FIG. 13, an augmented reality image data considering a person to be photographed can be generated to provide a user, so that it is possible to suggest the unprecedented use as an augmented reality providing apparatus.

In the meantime, in the description as described above, the digital camera is equipped with the augmented reality functionality but the head mount display HMD may also be equipped with the augmented reality functionality.

Figure 14:
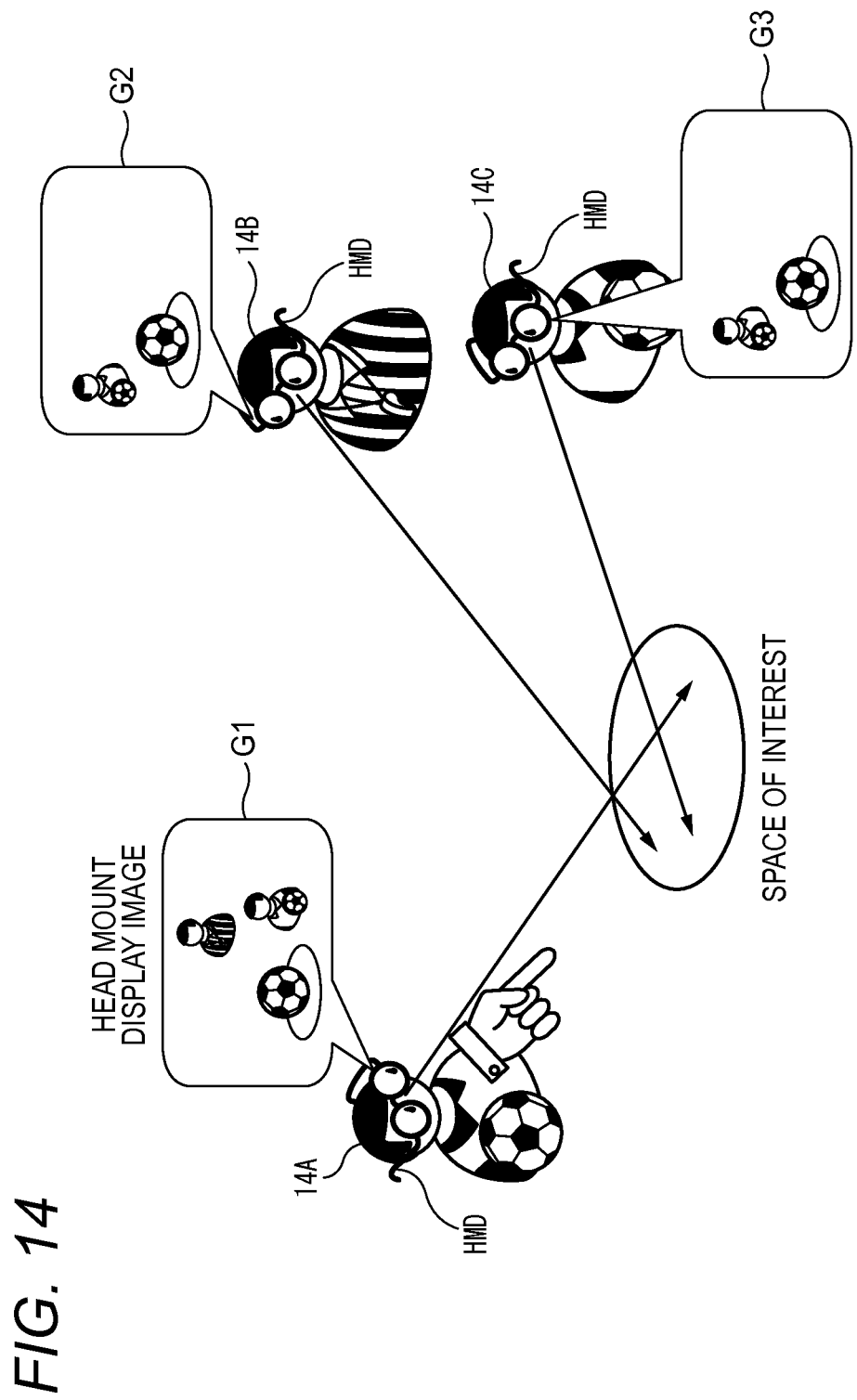
FIG. 14 is a view for explaining an operation when the digital camera illustrated in FIG. 1 is replaced with an HMD.

For example, a HMD having a block configuration illustrated in FIG. 1 or a modified configuration thereof will be exemplified for a case where three persons 14A, 14B and 14C wear the HMDs as illustrated in FIG. 14.

In this case, the person 14B and the person 14C are included in an image photographed by the imaging element 3 of the HMD that the person 14A wears. For this reason, the augmented reality image G1 in which the virtual object is superimposed on a position according to the lines-of-sight of the person 14B and the person 14C in the reality space image is displayed on the display unit 23 of the HMD that the person 14A wears.

Only the person 14A is included in an image photographed by the imaging element 3 of the HMD that the person 14B and the person 14B wear. For this reason, the augmented reality image G2 in which the virtual object is superimposed on a position according to the line-of-sight of the person 14A and the line-of-sight of the HMD that the person 14B wears is displayed on the display unit 23 of the HMD that the person 14B wears. Further, the augmented reality image G3 in which the virtual object is superimposed on a position according to the line-of-sight of the person 14A and the line-of-sight of the HMD that the person 14C wears is displayed on the display unit 23 of the HMD that the person 14C wears.

As described above, the augmented reality functionality can be provided in the HMD and thus, the augmented reality can be shared by both a person who takes photographs and a target to be photographed.

The augmented reality functionality described in the present embodiment may be provided in a three dimensional projector including an imaging device.

Figure 15:
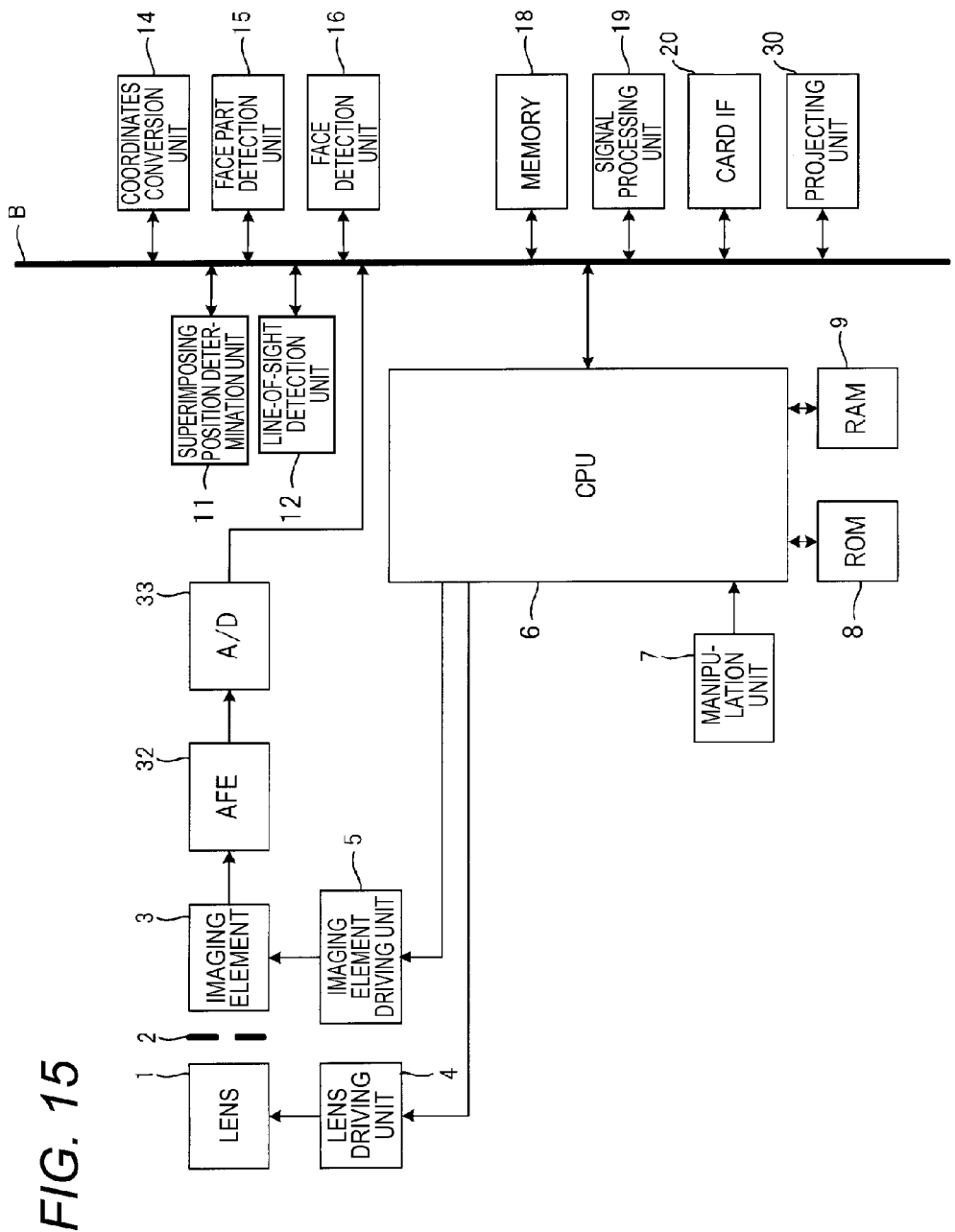
FIG. 15 is a view illustrating a schematic configuration of a three dimensional projector 150 for explaining an embodiment of the present invention.

FIG. 15 is a view illustrating a schematic configuration of a three dimensional projector 150 for explaining an embodiment of the present invention. The block configuration illustrated in FIG. 15 is the same as that of the digital camera illustrated in FIG. 1 except that the CG superimposing unit 17 is deleted and a projecting unit 30 instead of the display control unit 22 and the display unit 23 is installed therein.

A table in which a virtual space where the captured image data is converted into the global coordinates and a position of the real space corresponding to a position of the virtual space are recorded is registered in the three dimensional projector. Also, the superimposing position determination unit 11 read the position of the real space corresponding to the global coordinates of the determined point of interest from the table and instructs the projecting unit 30 to project the virtual object to the position of the real space.

The projecting unit 30 projects the virtual object to the position of the real space according to the instruction.

Figure 16:
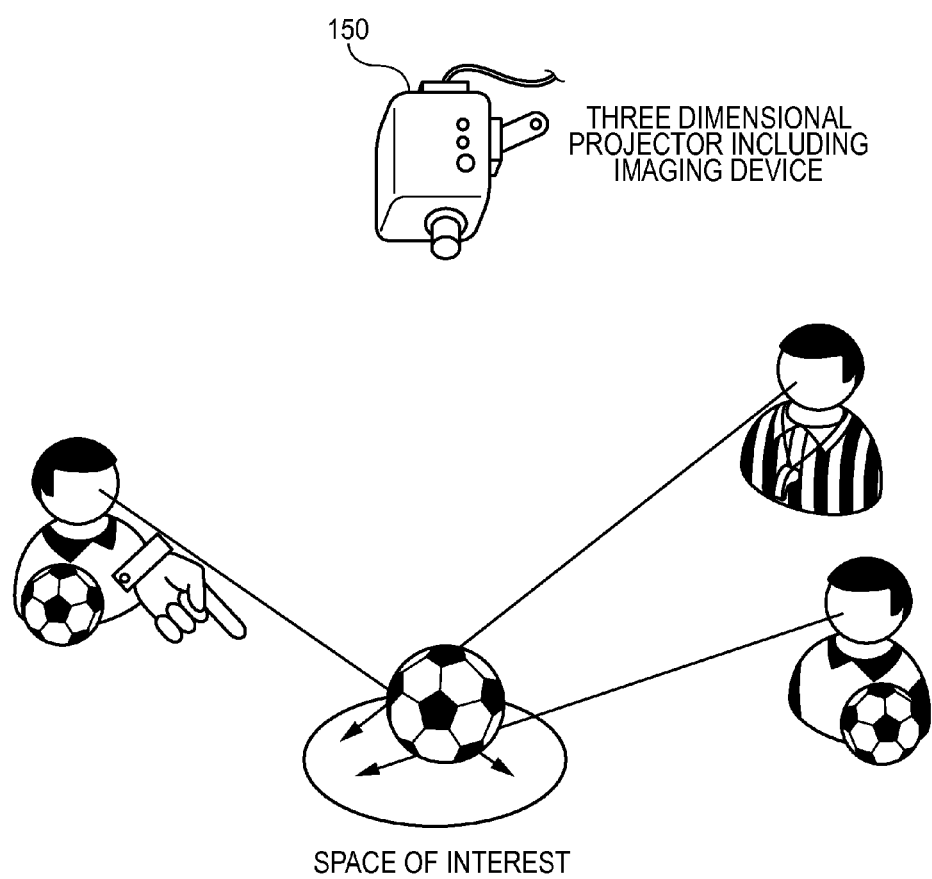
FIG. 16 is a view for explaining an operation of the projector illustrated in FIG. 15.

As illustrated in FIG. 16, when photographing three persons, a three dimensional projector 150 detects lines-of-sights of three persons included in the photographed image, determines the point of interest according to the detected line-of-sight, and projects a virtual object (a football in the example illustrated in FIG. 16) to the position of the real space corresponding to the determined line-of-sight.

By doing this, the persons being photographed share the virtual object without using the HMD.

In the meantime, parts of the three dimensional projector 150 used for photographing (the lens 1, the aperture 2, the imaging element 3, the AFE 32, the AD conversion unit 33, the lens driving unit 4, and the imaging element driving unit 5) may be individual members independent from a main body thereof. By separately configuring the parts used for photographing, the parts used for photographing can be placed on a position at which the line-of-sight of the person can be readily detected, so that the line-of-sight can be readily detected.

Additionally, the block configurations illustrated in FIG. 5 and FIG. 9 may also be configured such that the CG superimposing unit 17 is deleted and the projecting unit 30 instead of the display unit 23 and the display control unit 22 is installed and the instruction is issued to the projecting unit 30 to project the virtual object onto the point of interest determined by the superimposing position determination unit 11, thereby forming the three dimensional projector. Further, the modified example explained in FIG. 13 may also be applied to the three dimensional projector 150.

The augmented reality functionality explained in the present embodiment may also be implemented by a commercially available computer.

For example, a program for executing the respective steps of the flowchart illustrated in FIG. 4 is installed in a computer from a computer readable medium (e.g., CD-ROM, CD-R, DVD-ROM, DVD-R, USB memory) storing the program. When executing the program by the computer, the computer acquires the captured image data designated by a user at step S40 illustrated in FIG. 4, notifies the user that the augmented reality image data cannot be generated in a case where the determination result at step S42 is NO, the determination result at step S42 is NO, and no line segment is remained according to a result of the processing of step S48, and completes the process. Further, the computer causes an image based on the augmented reality image data to be displayed on the display unit connected to the computer at step S50.

Otherwise, a program for executing the respective steps of the flowchart illustrated in FIG. 8 and FIG. 12 is installed in a computer from a computer readable medium storing the program, and the database 10a illustrated in FIG. 5 or FIG. 9 is embedded therein. When executing the program by the computer, the computer acquires the captured image data designated by a user at step S40 illustrated in FIG. 8 and FIG. 12, notifies the user that the augmented reality image data cannot be generated in a case where the determination result at step S42 is NO and the determination results at step S44 and step S110 are NO, and completes the process. Further, the computer causes an image based on the augmented reality image data to be displayed on the display unit connected to the computer at step S50 and step S114.

Otherwise, a program for executing the respective steps of the flowchart illustrated in FIG. 13 is installed in a computer from a computer readable medium storing the program. When executing the program by the computer, the computer acquires the captured image data designated by a user at step S40 illustrated in FIG. 13, notifies the user that the augmented reality image data cannot be generated in a case where the determination result at step S42 is NO and no line segment is remained according to a result of the processing of step S48, and completes the process. Further, the computer causes an image based on the augmented reality image data to be displayed on the display unit connected to the computer at step S50.

As described above, the augmented reality image data can be generated on a commercially available computer without a image capturing functionality to reproduce it.

As described so far, the following matters are disclosed in the present specification.

The disclosed information presentation device is an information presentation device that presents information to a person in real space, including: a control unit that performs a control either to superimpose the information on a reality space image captured by the imaging element to be displayed on a display unit or to project the information on a position of the reality space; a line-of-sight detection unit that detects a line-of-sight of a person included in the reality space image captured by the imaging element; and an information presentation position determination unit that determines a superimposing position of the information or the position on the basis of the detected line-of-sight by the line-of-sight detection unit.

The disclosed information presentation device is an information presentation device further includes: an attribute determination unit that determines attributes of all the persons of which lines-of-sight are detected using images of all the persons and a database in which the images of the persons and the attributes thereof are recorded to be corresponded with each other; and an information contents determination unit that determines a content of information according to the attributes of all the persons.

The disclosed information presentation device is an information presentation device, in which the attribute of the person indicates at least one of sex, age, occupation, name and costume.

The disclosed information presentation device is an information presentation device, further including: an angle calculation unit that calculates an angle formed by the respective lines-of-sight of two persons included in the reality space image captured by the imaging element; and an information contents determination unit that determines the content of information according to at least the angle formed by the lines-of-sight.

The disclosed information presentation device is an information presentation device, further including: an attribute determination unit that determines the attributes of two persons using the images of the two persons and a database in which the images of the two persons and the attributes thereof are recorded to be corresponded with each other, in which the information contents determination unit determines the content of information according to the angle formed by the lines-of-sight and the attributes of the two persons.

The disclosed information presentation device is an information presentation device, in which the attribute of the person indicates at least one of sex, age, occupation, name and costume.

The disclosed information presentation device is an information presentation device, further including: an imaging element line-of-sight information acquisition unit that acquires information of a line-of-sight of the imaging element when only one person is included in the reality space image captured by the imaging element, in which the information presentation position determination unit determines a superimposing position of the information or the position based on the line-of-sight of the one person and the line-of-sight of the imaging element.

The disclosed digital camera is a digital camera, including: respective units of the information presentation device; the imaging element; and the display unit, in which the control unit performs the control to superimpose the information on the reality space image captured by the imaging element to be displayed on the display unit.

The disclosed head mount display is a head mount display, including: respective units of the information presentation device; the imaging element; and the display unit, in which the control unit performs the control to superimpose the information on the reality space image captured by the imaging element to be displayed on a display unit.

The disclosed projector is a projector, including: respective units of the information presentation device; and the imaging element, in which the control unit performs the control to project the information on the position of the reality space.

The disclosed information presentation method is an information presentation method in which information is presented to a person in real space, including: a control step of performing a control either to superimpose the information on a reality space image captured by the imaging element to be displayed on a display unit or to project the information on a position of the reality space; a line-of-sight detection step of detecting a line-of-sight of a person included in the reality space image captured by the imaging element; and an information presentation position determination step of determining information presentation position to determine a superimposing position of the information or the position on the basis of the detected line-of-sight by the line-of-sight detection unit.

The disclosed information presentation method is an information presentation method, further including: an attribute determination step of determining attributes of all the persons of which lines-of-sight are detected using images of all the persons and a database in which the images of the persons and the attributes thereof are recorded to be corresponded with each other; and an information contents determination step of determining a content of information according to the attributes of all the persons.

The disclosed information presentation method is an information presentation method, in which the attribute of the person indicates at least one of sex, age, occupation, name, and costume.

The disclosed information presentation method is an information presentation method, further including: an angle calculation step of calculating an angle formed by the respective lines-of-sight of two persons included in the reality space image captured by the imaging element; and an information contents determination step of determining the content of information according to at least the angle formed by the lines-of-sight.

The disclosed information presentation method is an information presentation method, further including: an attribute determination step of determining the attributes of two persons using the images of the two persons and a database in which the images of the two persons and the attributes thereof are recorded to be corresponded with each other, in which in the information contents determination step, it is determined the content of information according to the angle formed by the lines-of-sight and the attributes of the two persons.

The disclosed information presentation method is an information presentation method, in which the attribute of the person indicates at least one of sex, age, occupation, name, and costume.

The disclosed information presentation method is an information presentation method, further including: an imaging element line-of-sight information acquisition step of acquiring information of a line-of-sight of the imaging element when only one person is included in the reality space image captured by the imaging element, in which in the information presentation position determination step, it is determined a superimposing position of the information or the position based on the line-of-sight of the one person and the line-of-sight of the imaging element.

The disclosed information presentation program is a program that, when executed, causes respective steps of the information presentation method.

INDUSTRIAL APPLICABILITY

According to the present invention, it is possible to provide an information presentation device, an information presentation method and an information presentation program having improved convenience.

While the present invention has been described in detail or with reference to specific embodiments, it is apparent for those skilled in the art that various modifications or corrections can be made without departing from a spirit and scope of the present invention.

This application claims priority to and the benefits of Japanese Patent Application No. 2010-223278 filed on Sep. 30, 2010, the disclosure of which is incorporated herein by reference.

REFERENCE SIGNS LIST

3: imaging element, 11: superimposing position determination unit

12: line-of-sight detection unit, 17: CG superimposing unit, 23: display unit

The invention claimed is:

1. An information presentation device that presents information to a person in real space, comprising:
a processor that performs a control either to superimpose the information on a reality space image captured by an imaging element to be displayed on a display unit or to project the information on a position of the reality space,
wherein the processor is configured to control the information presentation device to:
detect lines-of-sight of a plurality of persons included in the reality space image captured by the imaging element;
determine a superimposing position of the information or the position of the reality space on the basis of the detected lines-of-sight of the plurality of the persons;
determine attributes of all the persons of which lines-of-sight are detected; and
determine a content of the information according to the attributes of all the persons, and
wherein the attribute of the person indicates at least one of sex, age, occupation, name and costume.

2. The information presentation device according to claim 1, wherein the processor is further configured to determine attributes of all the persons of which lines-of-sight are detected using images of all the persons and a database in which the images of the persons and the attributes thereof are recorded to be corresponded with each other.

3. The information presentation device according to claim 1, wherein the processor is further configured to:
calculate an angle formed by the respective lines-of-sight of two persons included in the reality space image captured by the imaging element; and
determine the content of the information according to at least the angle formed by the lines-of-sight.

4. The information presentation device according to claim 3, wherein the processor is further configured to:
determine the attributes of two persons using the images of the two persons and a database in which the images of the two persons and the attributes thereof are recorded to be corresponded with each other, and
wherein the information determining the content of the information comprises determining the content of the information according to the angle formed by the lines-of-sight and the attributes of the two persons.

5. The information presentation device according to claim 4, wherein the attribute of the person indicates at least one of sex, age, occupation, name and costume.

6. A digital camera, comprising:
the processor according to claim 1;
the imaging element; and
the display unit,
wherein the processor performs the control to superimpose the information on the reality space image captured by the imaging element to be displayed on the display unit.

7. A head mount display, comprising:
the processor according to claim 1;
the imaging element; and
the display unit,
wherein the processor performs the control to superimpose the information on the reality space image captured by the imaging element to be displayed on the display unit.

8. A projector, comprising:
the processor according to claim 1; and
the imaging element,
wherein the processor performs the control to project the information on the position of the reality space.

9. An information presentation method in which information is presented to a person in real space, comprising:
a control step of performing a control either to superimpose the information on a reality space image captured by an imaging element to be displayed on a display unit or to project the information on a position of the reality space;
a line-of-sight detection step of detecting a lines-of-sight of a plurality of persons included in the reality space image captured by the imaging element;
an information presentation position determination step of determining information presentation position to determine a superimposing position of the information or the position of the reality space on the basis of the detected lines-of-sight of the plurality of the persons;
an attribute determination step of determining attributes of all the persons of which lines-of-sight are detected; and
an information contents determination step of determining a content of the information according to the attributes of all the persons,
wherein the attribute of the person indicates at least one of sex, age, occupation, name, and costume.

10. The information presentation method according to claim 9, wherein
the attribute determination step determines attributes of all the persons of which lines-of-sight are detected using images of all the persons and a database in which the images of the persons and the attributes thereof are recorded to be corresponded with each other.

11. A non-transitory computer readable medium storing an information presentation program that, when executed, causes respective steps of the information presentation method according to claim 10.

12. The information presentation method according to claim 9, further comprising:

an angle calculation step of calculating an angle formed by the respective lines-of-sight of two persons included in the reality space image captured by the imaging element; and an information contents determination step of determining the content of the information according to at least the angle formed by the lines-of-sight.

13. The information presentation method according to claim 12, further comprising:

an attribute determination step of determining the attributes of two persons using the images of the two persons and a database in which the images of the two persons and the attributes thereof are recorded to be corresponded with each other, wherein in the information contents determination step, it is determined the content of the information according to the angle formed by the lines-of-sight and the attributes of the two persons.

14. The information presentation method according to claim 13, wherein the attribute of the person indicates at least one of sex, age, occupation, name, and costume.

\* \* \* \* \*